United States Patent
Gadde et al.

(10) Patent No.: US 6,708,496 B2
(45) Date of Patent: Mar. 23, 2004

(54) HUMIDITY COMPENSATION FOR COMBUSTION CONTROL IN A GAS TURBINE ENGINE

(75) Inventors: Satish Gadde, Orlando, FL (US); Richard Holm, Pittsburgh, PA (US); Chris Harrison, Oviedo, FL (US)

(73) Assignee: Siemens Westinghouse Power Corporation, Orlando, FL (US)

( * ) Notice: Subject to any disclaimer, the term of this patent is extended or adjusted under 35 U.S.C. 154(b) by 8 days.

(21) Appl. No.: 10/153,046

(22) Filed: May 22, 2002

(65) Prior Publication Data
US 2003/0217554 A1 Nov. 27, 2003

(51) Int. Cl.$^7$ ................................. F02C 9/28
(52) U.S. Cl. ...................... 60/773; 60/39.281
(58) Field of Search ................ 60/39.281, 773

(56) References Cited

U.S. PATENT DOCUMENTS

| | | |
|---|---|---|
| 2,863,282 A | 12/1958 | Torell |
| 3,038,308 A | 6/1962 | Fuller |
| 3,100,964 A | 8/1963 | Bevers et al. |
| 3,353,360 A | 11/1967 | Gorzegno |
| 3,693,347 A | 9/1972 | Kydd et al. |
| 3,826,080 A | 7/1974 | DeCorso et al. |
| 4,160,362 A | 7/1979 | Martens et al. |
| 4,259,837 A | 4/1981 | Russell et al. |
| 4,313,300 A | 2/1982 | Wilkes et al. |
| 4,380,894 A * | 4/1983 | Abo et al. ............... 60/39.281 |
| 4,394,118 A | 7/1983 | Martin |
| 4,418,527 A | 12/1983 | Schlom et al. |
| 4,710,095 A | 12/1987 | Freberg et al. |
| 4,773,846 A | 9/1988 | Munk |
| 4,808,235 A | 2/1989 | Woodson et al. |
| 4,926,620 A | 5/1990 | Donlee |
| 5,011,540 A | 4/1991 | McDermott |
| 5,054,279 A | 10/1991 | Hines |
| 5,259,184 A | 11/1993 | Borkowicz et al. |
| 5,331,806 A | 7/1994 | Warkentin |
| 5,463,873 A | 11/1995 | Early et al. |
| 5,469,700 A * | 11/1995 | Corbett et al. ........... 60/39.281 |
| 5,471,831 A | 12/1995 | Rowe |
| 5,743,079 A * | 4/1998 | Walsh et al. ............. 60/39.281 |
| 5,867,977 A | 2/1999 | Zachary et al. |
| 5,930,990 A | 8/1999 | Zachary et al. |
| 5,996,351 A | 12/1999 | Feitelberg et al. |
| 6,260,350 B1 | 7/2001 | Horii et al. |

* cited by examiner

Primary Examiner—Michael Koczo

(57) ABSTRACT

A gas turbine engine (12) wherein combustion conditions are controlled as a function of the humidity of the ambient air (36) in order to ensure stable, emission-compliant performance over a range of ambient conditions. The pilot fuel fraction supplied to a dual mode combustor (10) may be controlled to be responsive to the relative humidity or the specific humidity of the ambient air. Humidity may be measured directly or it may be calculated as a function of other temperature and pressure measurements. A fuel system (44) is controlled by a controller (46) having as inputs the signals from one or more of a relative humidity sensor (62), a barometric pressure sensor (56), a wet bulb temperature sensor (58) and a dry bulb temperature sensor (60).

16 Claims, 1 Drawing Sheet

HUMIDITY COMPENSATION FOR COMBUSTION CONTROL IN A GAS TURBINE ENGINE

FIELD OF THE INVENTION

This invention relates generally to the field of gas turbine engines, and more particularly to the control of the combustion process within a gas turbine engine in order to avoid destructive dynamics and to minimize undesirable emissions.

BACKGROUND OF THE INVENTION

The products of combustion of fossil fuels include carbon dioxide, carbon monoxide, unburnt hydrocarbons and nitrogen oxide (NOx), among others. Various control schemes and hardware configurations have been used to control the concentration of such emissions while at the same time providing fuel-efficient and stable engine operation. Regulatory changes continue to reduce the allowable level of emissions from electric power generating plants utilizing gas turbine engines. Gas turbine power plants in most locations must now be operated to produce no more than 15 ppm NOx, and in some locations, to produce no more than 7 ppm NOx or even 3.5 ppm NOx. Carbon monoxide emission limits can be as low as 10 ppm. To achieve such low levels of emissions, it is necessary to establish and to maintain very lean combustion conditions. Lean combustion is known to be less stable than rich combustion, and lean-burn combustors are more prone to damaging pressure pulsations generated within the combustor. Precise "tuning" of the combustion process is needed to establish a balance between stable combustion and low emissions. A precisely tuned engine may be susceptible to drift over time, with a resulting increase in emissions or an increase in the level of combustion instability.

One known approach to controlling the emissions from a gas turbine power plant is to install a catalyst downstream of the turbine. With this approach, the combustor can run at a relatively rich setting, thereby ensuring stable combustion while generating excessive amounts of undesirable emissions. The exhaust gas is then cleaned to regulatory limits by passing it through a combustion catalyst installed downstream of the combustor in the turbine exhaust system. Catalyst systems are expensive and are often used as a last resort in especially rigorous regulatory situations.

The generation of NOx emissions is directly related to the peak flame temperature in the combustor. For more than two decades it has been known to control the peak flame temperature in a gas turbine combustor by injecting water into the combustor. U.S. Pat. No. 4,160,362 dated Jul. 10, 1979, describes a gas turbine power plant having a reduced level of nitrogen oxide emissions. The gas turbine power plant described in that patent includes a system for controlling the amount of water injected into the combustor as a function of gas turbine load corrected for variations in compressor inlet temperature, i.e. ambient temperature. Temperature compensation is also known for determining the pilot fuel fraction in a dual-mode gas turbine combustor. The present inventors are unaware of any prior art gas turbine system that accommodates changes in the moisture content of the ambient air.

SUMMARY OF THE INVENTION

Further improvements in gas turbine engines and control schemes are desired to provide stable, reliable operation at ever-decreasing emission levels.

A method of controlling a dual-mode gas turbine combustor having a pre-mixed combustion zone and a pilot diffusion combustion zone is described herein. Pilot fuel fraction is defined as a ratio of a fuel flow rate to the pilot diffusion combustion zone divided by a sum of the fuel flow rate to the pilot diffusion combustion zone plus a fuel flow rate to the pre-mixed combustion zone. The method described herein includes controlling the pilot fuel fraction as a function of a level of humidity of ambient air used for combustion in the combustor. The method may further include controlling the pilot fuel fraction in response to a measurement of relative humidity of the ambient air, or in response to measurements of relative humidity and temperature of the ambient air. The method may include controlling the pilot fuel fraction as a function of specific humidity of the ambient air, or controlling the pilot fuel fraction in response to respective measurements of dry bulb temperature, relative humidity and barometric pressure of the ambient air. The method may further include controlling the pilot fuel fraction in response to respective measurements of dry bulb temperature, wet bulb temperature and barometric pressure of the ambient air.

A gas turbine engine having a dual-mode combustor is described herein as including: a pre-mixed combustion zone; a pilot diffusion combustion zone; a sensor for producing a humidity signal responsive to a level of humidity of ambient air used for combustion in the combustor; and a fuel system for providing a pilot fuel fraction responsive to the humidity signal, the pilot fuel fraction being a ratio of a fuel flow rate provided to the pilot diffusion combustion zone divided by a sum of the fuel flow rate provided to the pilot diffusion combustion zone plus a fuel flow rate provided to the pre-mixed combustion zone. The sensor for producing the humidity signal may be a relative humidity sensor. Alternatively, the sensor for producing a humidity signal may include: a dry bulb temperature sensor for producing a dry bulb temperature signal; a relative humidity sensor for producing a relative humidity signal; a barometric pressure sensor for producing a barometric pressure signal; and a calculator for generating the humidity signal responsive to the dry bulb temperature signal, the relative humidity signal and the barometric pressure signal. The sensor for producing a humidity signal may include: a dry bulb temperature sensor for producing a dry bulb temperature signal; a wet bulb temperature sensor for producing a wet bulb temperature signal; a barometric pressure sensor for producing a barometric pressure signal; and a calculator for generating the humidity signal responsive to the dry bulb temperature signal, the web bulb temperature signal and the barometric pressure signal.

A method of controlling a gas turbine engine is described herein as including controlling a fuel flow to a combustor of a gas turbine engine in response to a level of humidity of ambient air used for combustion in the combustor. The method may include controlling a ratio of fuel and air in at least a portion of the combustor in response to the level of humidity. The method may include controlling a pilot fuel fraction of a total fuel flow rate to the combustor in response to the level of humidity.

BRIEF DESCRIPTION OF THE DRAWINGS

These and other advantages of the invention will be more apparent from the following description in view of the drawings that show.

DETAILED DESCRIPTION OF THE INVENTION

The present inventors have found that it is possible to improve the performance of a dual-mode gas turbine engine by automatically adjusting the pilot fuel fraction as a function of the humidity of the ambient air in order to maintain a proper balance between emission control and combustion dynamics control. A change in the pilot fuel fraction results in a change in the ratio of fuel and air in portions of the combustor, i.e. a higher pilot fuel fraction provides a richer fuel/air mixture in the pilot flame. By automatically adjusting flame conditions in at least a portion of the combustor to account for changes in the ambient air humidity, a more precise tuning of the combustion process may be achieved, thereby facilitating a reduced level of emissions, while at the same time reducing the risk of unstable combustion conditions arising as a result of changes in ambient environmental conditions.

Figure 1:
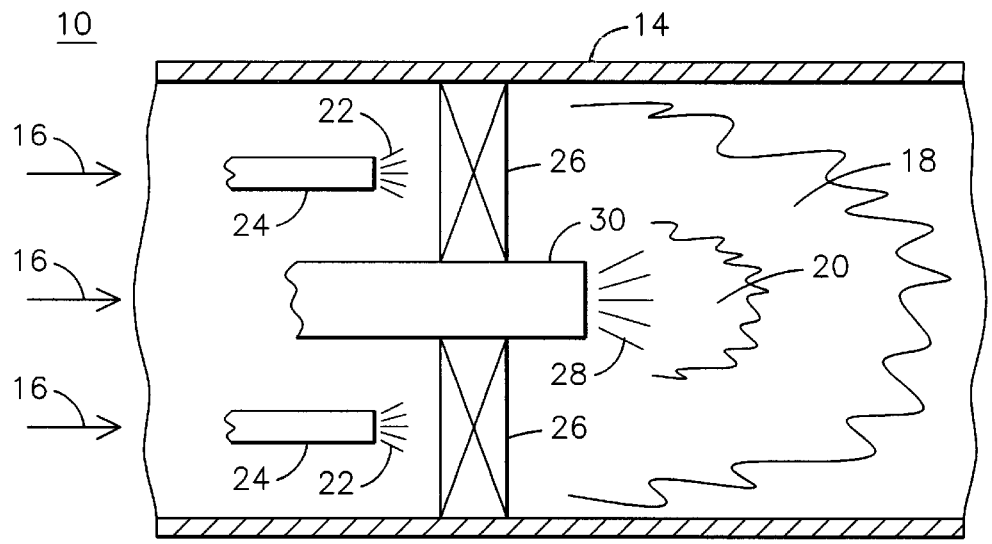
FIG. 1 is a partial cross-sectional view of a prior art dual-mode combustor of a gas turbine engine.

A dual-mode combustor 10 is illustrated in partial cross-section in FIG. 1. The combustor 10 includes a generally tubular-shaped wall 14 defining a flow path for combustion air 16. The combustor is called "dual-mode" because it includes two separate, but interacting, combustion zones; a pre-mixed combustion zone 18 and a diffusion combustion zone 20. Dual-mode combustors are known in the art and are part of gas turbine engines sold by the assignee of the present invention under the trademark W501 G, W501 FD I, W501 FD II, W501 FC, W501 D5A, W501 D5 and W251 B12 A. As the name implies, the pre-mixed combustion zone 18 is a volume wherein a pre-mixed combination of fuel and combustion air 16 is combusted. A flow of combustible fuel 22, such as natural gas for example, is delivered via a main fuel tube 24 into the combustion air 16 upstream of a swirler 26. The swirler 26 provides a mixing action that ensures a complete and even distribution of the unburned fuel 22 within combustion air 16. This mixture enters the pre-mixed combustion zone 18 where it is ignited and combusted. A separate supply of combustible fuel 28 is provided through a pilot nozzle 30. The pilot fuel 28 mixes with the incoming combustion air 16 to form a diffusion flame in the pilot diffusion combustion zone 20. It is known in the art to supply a relatively lean fuel/air mixture in the pre-mixed combustion zone 18 in order to reduce the emission of carbon-based compounds from the engine 12. It is also known to provide a relatively rich fuel/air mixture in the pilot diffusion combustion zone 20 to provide stability for the combustion process. The present inventors find that the pilot diffusion flame is a primary source of NOx emissions due to the higher flame temperature resulting from the relatively rich combustion conditions.

Figure 2:
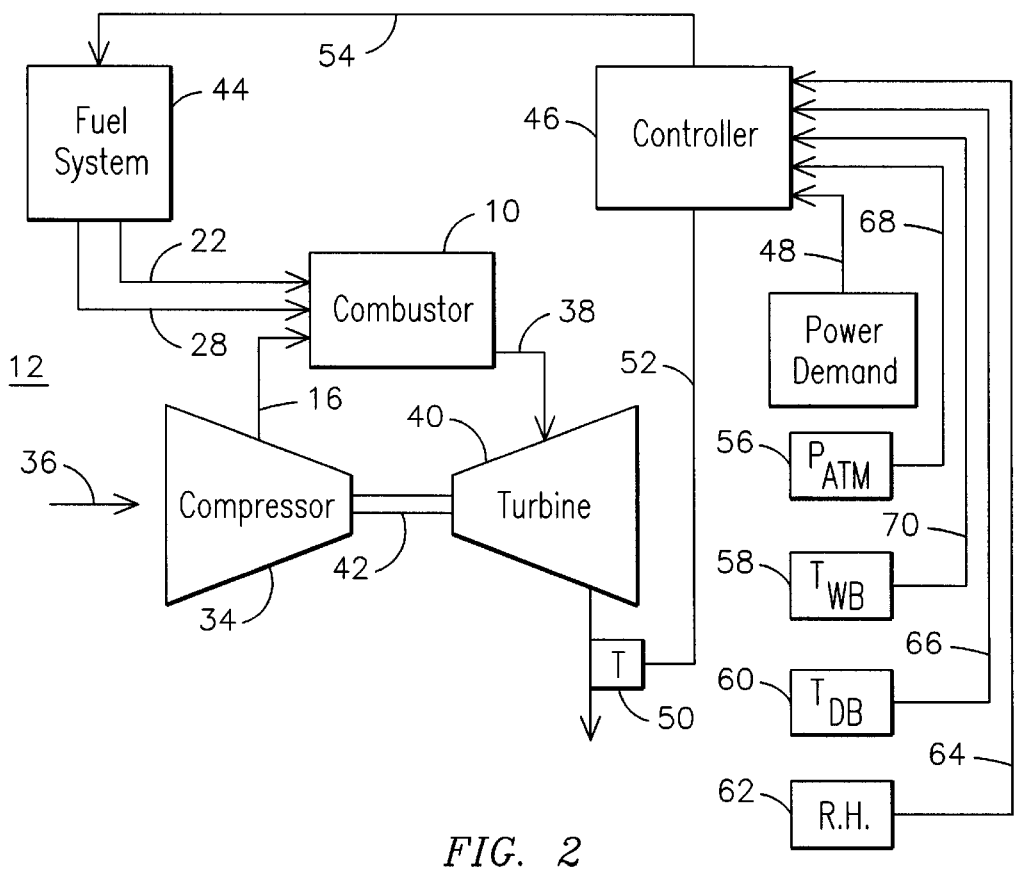
FIG. 2 is a schematic illustration of a gas turbine engine featuring one embodiment of the present invention.

FIG. 2 is a schematic illustration of a gas turbine engine 12 including combustor 10. Combustor 10 is provided with a flow of compressed combustion air 16 by compressor 34 which, in turn, receives a supply of ambient air 36. The hot combustion gas 38 exits combustor 10 through a transition piece and is delivered to a turbine 40 where energy is extracted to turn shaft 42. Shaft 42 may be used to power the compressor 34 and auxiliary equipment such as an electrical generator (not shown).

A fuel system 44 provides two separately controllable flows of combustible fuel to the combustor 10; a main fuel flow 22 supplied to the pre-mixed combustion zone 18 and a pilot fuel flow 28 supplied to the pilot diffusion combustion zone 20. The term pilot fuel fraction is known in the art and is defined as the ratio of the fuel flow rate supplied to the pilot diffusion combustion zone 20 divided by a sum of the fuel flow rate supplied to the pilot diffusion combustion zone 20 plus the fuel flow rate supplied to the pre-mixed combustion zone 18.

The present invention contemplates real-time automated control of the combustion process responsive to changes in ambient conditions. The combustion process may be controlled by modulating the fuel flow to the combustor 10 in response to a humidity value of the ambient air 36. To accomplish such automated control, a controller 46 is provided. Controller 46 may be a computer or microprocessor provided with executable instructions. Other types of controllers may be used, such as a digital or analog control system or any other device for receiving input signals and for producing appropriate output signals. One such system is the WDPF/TXP Control System commonly provided with gas turbine-generator packages sold by the assignee of the present invention. Controller 46 receives a power demand signal 48 that is manipulated by an operator for inputting a desired power level for operation of the engine 12. A turbine exhaust temperature sensor 50 provides an exhaust temperature signal 52 to controller 46 as an indication of the actual engine operating power level. Controller 46 provides fuel system control signal 54 to fuel system 44 for controlling the amount of fuel provided to combustor 10 in response to the power demand signal 48. Control signal 54 may take many forms, depending upon the type of device used for controller 46 and fuel system 44. As is known in the art, the fraction of the total fuel that is provided by the fuel system 44 to the pilot stage, i.e. the pilot fuel fraction, may be controlled to be a predetermined value that is a function of the power level of the combustor. The following table is one example of such a function, with the values in the specific ranges varying linearly between the extremes of the respective range.

TABLE 1

| % Load | Pilot Fuel Fraction |
| --- | --- |
| to 50% | 0.250 |
| 50 to 60% | 0.250–0.120 |
| 60 to 70% | 0.120–0.052 |
| 70 to 80% | 0.052–0.050 |
| 80 to 90% | 0.050–0.046 |
| 90 to 97% | 0.046–0.042 |
| above 97% | 0.040 |

These values represent a fundamental curve for pilot stage fuel fraction. It is also known to change the pilot fuel fraction by a value that varies with the temperature of the ambient air 36. Such a temperature compensation value may also be determined from a function, such as:

TABLE 2

| Temperature ° F. | Pilot Fuel Fraction Increase |
| --- | --- |
| below −5 | 0.012 |
| −5 to 5 | 0.012–0.010 |
| 5 to 20 | 0.010–0.008 |
| 20 to 30 | 0.008–0.006 |
| 30 to 40 | 0.006–0.005 |
| 40 to 45 | 0.005–0.004 |
| 45 to 50 | 0.004–0.003 |
| 50 to 60 | 0.003–0.002 |
| above 60 | 0.001 |

The temperature compensation value of Table 2 is additive to the pilot fuel fraction value determined in Table 1. A similar type of control scheme may be used to control the amount of combustion air 16 being provided to the combustor 10. Such control is accomplished by adjusting the position of the inlet guide vanes and/or combustor bypass valves (not shown) as a function of power level and temperature.

The temperature compensation value for the pilot fuel fraction may be further adjusted as a function of the power level of the combustor. Such adjustment may be used to compensate for combustion instabilities that may occur in a particular engine in a specific power range. A multiplier to be applied to the temperature compensation value of Table 2 may be determined by controller 46 by a function such as the following.

TABLE 3

| % Load | Multiplier |
| --- | --- |
| 0 up to 70% | 1.00 |
| 70 up to 80% | 1.00–0.50 |
| 80 up to 90% | 0.50–0.75 |
| above 90% | 1.00 |

Thus, at 55% power with an ambient air temperature of 70° F. the pilot fuel fraction would be 0.120+[0.001×1.00]= 0.121.

The present inventors have found that such temperature compensation alone does not always provide satisfactory results. As environmental regulations continue to drive the allowable emissions levels downward, the margin for error between safe, emission-compliant operation and damaging dynamic oscillations of the combustion process is narrowed. Accordingly, gas turbine engine 12 also includes a means for providing an automatic adjustment of the pilot fuel fraction in response to the level of humidity of the ambient air 36. Gas turbine engine 12 is illustrated as having a plurality of sensors for sensing parameters of the ambient air 36. These sensors include a barometric pressure sensor 56, a web bulb temperature sensor 58, a dry bulb temperature sensor 60 and a relative humidity sensor 62. These sensors are used directly or indirectly to determine a level of humidity in the ambient air 36, as will be described more fully below. The pilot fuel fraction as a function of power and temperature, obtained from Tables 1–3 above, is then adjusted in response to the level of humidity in order to counteract the effects on the combustion process of changes in the moisture content of the ambient air.

In one embodiment, the pilot fuel fraction of engine 12 is controlled to be a function of three variables; the power level of the combustor, the ambient temperature, and the relative humidity of the ambient air. Relative humidity may be measured with any commercially available relative humidity sensor 62, such as those provided by the VAISALA Group (http://www.vaisala.com/). The relative humidity sensor 62 provides a relative humidity signal 64 to controller 46. Controller 46 is responsive to relative humidity signal 64 to determine a multiplication factor to be applied to the temperature compensation value determined in Table 2 above. Controller 46 may develop the multiplication factor from a look-up table such as the following relative humidity multiplier table.

TABLE 4

| % Relative Humidity | Relative Humidity Multiplier |
| --- | --- |
| 0 up to 60% | 1.0 |
| 60 up to 80% | 1.0–1.2 |
| 80 up to 90% | 1.2–1.4 |
| 90 up to 100% | 1.4–1.9 |
| 100% | 2.3 |

The use of this relative humidity multiplier will be explained with reference to the example provided above of an engine operating at 55% power with an ambient air temperature of 70° F. If the relative humidity of the ambient air 36 is 92%, the pilot fuel fraction would be determined to be 0.120+ [0.001×1.00×1.9]=0.1219. Executable instructions are used by controller 46 to perform this calculation. Controller 46 provides an output fuel system control signal 54 responsive to this calculated pilot fuel fraction value to cause fuel system 44 to produce flow rates in the main fuel supply 22 and the pilot fuel supply 28 for creating the corresponding pilot fuel fraction in combustor 10.

In a further embodiment of the present invention, the pilot fuel fraction of engine 12 is controlled to be a function of specific humidity of the ambient air. Specific humidity may be used in lieu of relative humidity to capture the effect of barometric pressure. The fundamental value for pilot stage fuel fraction obtained from Table 1 may be augmented by a value dependant upon a specific humidity value (lbs. water vapor/lbs. dry air). The specific humidity compensation value may be determined by controller 46 from a look-up table such as the following.

TABLE 5

| Specific Humidity | Pilot Fuel Fraction Increase |
| --- | --- |
| 0 up to 0.002 | 0.000 |
| 0.002 up to 0.008 | 0.000–0.002 |
| 0.008 up to 0.015 | 0.002–0.0025 |
| 0.015 up to 0.020 | 0.0025–0.0028 |
| 0.020 up to 0.025 | 0.0028–0.0030 |
| 0.025 up to 0.030 | 0.0030–0.0032 |
| above 0.030 | 0.0035 |

The specific humidity bias of Table 5 may further be made a function of the power level of the engine, such as with the multiplier value obtained from Table 3. For example, for an engine operating at 55% power with an ambient air temperature of 70° F. and a specific humidity of the ambient air 36 of 0.021, the pilot fuel fraction would be calculated to be 0.120+[0.0030×1.00]=0.1230.

The present inventors are not aware of any instrument that can directly determine or calculate specific humidity and provide an input to a control system. Accordingly, the present inventors have developed two alternative techniques for determining the specific humidity value. The first such technique involves calculating a specific humidity value ($\omega$, lbs. water vapor/lbs. dry air) as a function of the ambient dry bulb temperature ($T_{db}$, ° F.), relative humidity ($\phi$, %) and barometric pressure ($P_{atm}$, psi). In addition to relative humidity signal 64, controller 46 is provided with a dry bulb temperature signal 66 from dry bulb temperature sensor 60 and a barometric pressure signal 68 from barometric pressure sensor 56. Controller 46 may include programmed instructions for calculating a vapor saturation pressure Pg (psi) at the ambient barometric pressure and for calculating a partial pressure of water vapor in air Pv (psi) as follows:

$$Pg = 14.504 \times 10^{5.9364-(2216.53+0.5555 \times (Tdb+459.67))} \quad (1)$$

$$Pv = (\phi \div 100) \times Pg \quad (2)$$

Controller 46 may then be used to calculate a specific humidity value as follows:

$$\omega = Pv \div [1.608 \times (P_{atm} - Pv)] \quad (3)$$

In one example, $T_{db}=56°$ F.; $P_{atm}=14.88$ psia; $\phi=83\%$, so that:

$Pg = 0.2295$ psi (from relation 1)

$Pv = 0.83 \times 0.2295 = 0.1905$ psi (from relation 2)

$\omega = 0.1905/[1.608 \times (14.88-0.1905)] = 0.00806$ lbs/lbs (from relation 3)

This value is then used with Table 5 to determine the specific humidity bias as described above. The resulting increase and decrease in the pilot fuel fraction as a function of the humidity of the ambient air 36 will automatically maintain the gas turbine emissions within initial start-up ranges in spite of changes in the ambient conditions. Equations 1, 2 and 3 provide a sufficiently accurate approximation of specific humidity based upon measurements of temperature, relative humidity and barometric pressure without the need to maintain complete steam tables in a memory portion of controller 46. This is an important advantage when implementing this invention in a field controller environment where memory space is somewhat limited.

A second technique for calculating a specific humidity value involves the use of measurements of ambient dry bulb temperature, ambient wet bulb temperature ($T_{wb}$, ° F.), and barometric pressure. Since relative humidity gages are known to be more fragile than some other types of ambient air sensors, it may be preferable to avoid the use of a relative humidity sensor 62 as described in the embodiments above. Wet bulb temperature sensor 58 provides a wet bulb temperature signal 70 to controller 46. Controller 46 is programmed with instructions for performing the following calculations. First, the barometric pressure is converted from units of psia to inches of mercury:

$$P = P_{atm} \times 2.0359 \quad (4)$$

Then, in lieu of using steam tables, relative humidity is calculated as follows, beginning with the calculation of the saturation vapor pressure at dry bulb temperature $P_{db}$.

$$P_{db} = (4.413 \times 10^{11})T_{db}^5 + (4.5224 \times 10^{10})T_{db}^4 + 8.6346 \times 10^7)$$

$$T_{db}^3 + (2.9593 \times 10^5)T_{db}^2 + 2.4521 T_{db} + 0.041414 \quad (5)$$

The saturation vapor pressure at the web bulb temperature $P_{wb}$ is then calculated as:

$$P_{wb} = (4.413 \times 10^{11})T_{wb}^5 + (4.5224 \times 10^{10})T_{wb}^4 + 8.6346 \times 10^7)$$

$$T_{wb}^3 + (2.9593 \times 10^5)T_{wb}^2 + 2.4521 T_{wb} + 0.041414 \quad (6)$$

The actual vapor pressure $P_{act}$ is calculated as:

$$P_{act} = P_{wb} + (T_{db} - T_{wb})(P_{wb} - P) \times [1 + 0.15577$$

$$(P_{wb}/P)]/(2829.454767 - 1.47359696 T_{db}) \quad (7)$$

Relative humidity RH is calculated as:

$$RH = P_{act}/P_{db} \times 100 \quad (8)$$

And finally, specific humidity $\omega$ is calculated as:

$$\omega = 0.62198 P_{act}/(P - P_{act}) \quad (9)$$

In one example, $T_{db}=56°$ F.; $T_{wb}=52.5°$ F.; and $P_{atm}=14.88$ psia, so that

| | |
|---|---|
| $P = 14.88 \times 2.0359 = 30.29$ inches of Hg | (from relation 4) |
| $P_{db} = 0.451924$ inches of Hg | (from relation 5) |
| $P_{wb} = 0.397697$ inches of Hg | (from relation 6) |
| $P_{act} = 0.3595$ inches of Hg | (from relation 7) |
| $RH = 0.3595/0.451924 \times 100 = 79.55\%$ | (from relation 8) |
| $\omega = 0.62198 \times 0.3595/(30.29 - 0.3595)$ $= 0.007470$ lb/lb | (from relation 9) |

This value is then used with Table 5 to determine the specific humidity bias as described above.

While the preferred embodiments of the present invention have been shown and described herein, it will be obvious that such embodiments are provided by way of example only. Numerous variations, changes and substitutions will occur to those of skill in the art without departing from the invention herein. Accordingly, it is intended that the invention be limited only by the spirit and scope of the appended claims.

We claim as our invention:

1. A method of controlling a dual-mode gas turbine combustor having a pre-mixed combustion zone and a pilot diffusion combustion zone, pilot fuel fraction being defined as a ratio of a fuel flow rate to the pilot diffusion combustion zone divided by a sum of the fuel flow rate to the pilot diffusion combustion zone plus a fuel flow rate to the pre-mixed combustion zone, the method comprising controlling the pilot fuel fraction as a function of a level of humidity of ambient air used for combustion in the combustor.

2. The method of claim 1, further comprising controlling the pilot fuel fraction in response to a measurement of relative humidity of the ambient air.

3. The method of claim 1, further comprising controlling the pilot fuel fraction in response to a measurement of relative humidity of the ambient air and further in response to a measurement of temperature of the ambient air.

4. The method of claim 1, further comprising controlling the pilot fuel fraction as a function of specific humidity of the ambient air.

5. The method of claim 4, further comprising controlling the pilot fuel fraction in response to respective measurements of dry bulb temperature, relative humidity and barometric pressure of the ambient air.

6. The method of claim 4, further comprising calculating a specific humidity value ($\omega$, lbs. water vapor/lbs. dry air) as a function of ambient dry bulb temperature ($T_{db}$, ° F.), relative humidity ($\phi$, %) and barometric pressure ($P_{atm}$, psi) by calculating:

$$Pg = 14.504 \times 10^{5.9364-(2216.53+0.5555 \times (Tdb+459.67))}$$

$$Pv = (\phi \div 100) \times Pg$$

$$\omega = Pv \div [1.608 \times (P_{atm} - Pv)].$$

7. The method of claim 4, further comprising controlling the pilot fuel traction in response to respective measurements of dry bulb temperature, wet bulb temperature and barometric pressure of the ambient air.

8. The method of claim 4, further comprising calculating a specific humidity value ($\omega$, lbs. water vapor/lbs. dry air) as a function of ambient dry bulb temperature ($T_{db}$, °F.), ambient wet bulb temperature ($T_{wb}$, °F.), and barometric pressure ($P_{atm}$, psi) by calculating:

$$P = P_{atm} \times 2.0359$$

$$P_{db} = (4.413 \times 10^{11})T_{db}^5 + (4.5224 \times 10^{10})T_{db}^4 + 8.6346 \times 10^7)Tdb^3 + (2.9593 \times 10^5)T_{db}^2 + 2.4521\ T_{db} + 0.041414$$

$$P_{wb} = (4.413 \times 10^{11})T_{wb}^5 + (4.5224 \times 10^{10})T_{wb}^4 + 8.6340 \times 10^7)T_{wb}^3 + (2.9593 \times 10^5)T_{wb}^2 + 2.4521\ T_{wb} + 0.041414$$

$$P_{act} = P_{wb} + (T_{db} + T_{wb})(P_{wb} - P) \times [1 + 0.15577(P_{wb}/P)]/(2829.454767 - 1.47359696\ T_{db})$$

$$RH = P_{act}/P_{db} \times 100$$

$$\omega = 0.62198\ P_{act}/(P - P_{act}).$$

9. A gas turbine engine having a dual-mode combustor comprising:

a pre-mixed combustion zone;

a pilot diffusion combustion zone;

a sensor for producing a humidity signal responsive to a level of humidity of ambient air used for combustion in the combustor; and a fuel system for providing a pilot fuel fraction responsive to the humidity signal, the pilot fuel fraction being a ratio of a fuel flow rate provided to the pilot diffusion combustion zone divided by a sum of the fuel flow rate provided to the pilot diffusion combustion zone plus a fuel flow rate provided to the pre-mixed combustion zone.

10. The gas turbine engine of claim 9, wherein the sensor for producing a humidity signal comprises a relative humidity sensor.

11. The gas turbine engine of claim 9, wherein the sensor for producing a humidity signal comprises:

a dry bulb temperature sensor for producing a dry bulb temperature signal;

a relative humidity sensor for producing a relative humidity signal;

a barometric pressure sensor for producing a barometric pressure signal; and a calculator for generating the humidity signal responsive to the dry bulb temperature signal, the relative humidity signal and the barometric pressure signal.

12. The gas turbine engine of claim 11, wherein the calculator comprises executable instructions for calculating a specific humidity value ($\omega$, lbs. water vapor/lbs. dry air) as a function of ambient dry bulb temperature ($T_{db}$, °F.), relative humidity ($\phi$, %) and barometric pressure ($P_{atm}$, psi) by calculating:

$$Pg = 14.504 \times 10^{5.9364 - (2218.63 + 0.5555 \times (Tdb + 459.67))}$$

$$Pv = (\phi + 100) \times Pg$$

$$\omega = Pv + [1.608 \times (P_{atm} - Pv)].$$

13. The gas turbine engine of claim 9, wherein the sensor for producing a humidity signal comprises:

a dry bulb temperature sensor for producing a dry bulb temperature signal;

a wet bulb temperature sensor for producing a wet bulb temperature signal;

a barometric pressure sensor for producing a barometric pressure signal; and a calculator for generating the humidity signal responsive to the dry bulb temperature signal, the web bulb temperature signal and the barometric pressure signal.

14. The gas turbine engine of claim 11, wherein the calculator comprises executable instructions for calculating a specific humidity value ($\omega$, lbs. water vapor/lbs. dry air) as a function of ambient dry bulb temperature ($T_{db}$, °F.), ambient wet bulb temperature ($T_{wb}$, °F.), and barometric pressure ($P_{atm}$, psi) by calculating:

$$P = P_{atm} \times 2.0359$$

$$P_{db} = (4.413 \times 10^{11})T_{db}^5 + (4.5224 \times 10^{10})T_{db}^4 + 8.8346 \times 10^7)T_{db}^3 + (2.9593 \times 10^5)T_{db}^2 + 2.4521\ T_{db} + 0.041414$$

$$P_{wb} = (4.413 \times 10^{11})T_{wb}^5 + (4.5224 \times 10^{10})T_{wb}^4 + 8.6346 \times 10^7)T_{wb}^3 + (2.9593 \times 10^5)T_{wb}^2 + 2.4521\ T_{wb} + 0.041414$$

$$P_{act} = P_{wb} + (T_{db}T_{wb})(P_{wb} - P) \times [1 + 0.15577(P_{wb}/P)]/(2829.454767 - 1.47359696\ T_{db})$$

$$RH = P_{act}/P_{db} \times 100$$

$$\omega = 0.62198\ P_{act}/(P - P_{act}).$$

15. A method of controlling a gas turbine engine, the method comprising controlling a fuel flow to a combustor of a gas turbine engine in response to a level of humidity of ambient air used for combustion in the combustor, said fuel flow comprising a first flow of fuel from a first fuel source and a second flow of fuel from a second fuel source, and controlling a pilot fuel fraction of a total fuel flow rate to the combustor in response to the level of humidity.

16. The method of claim 15, further comprising controlling a ratio of fuel and air in at least a portion of the combustor in response to the level of humidity.

* * * * *